(12) United States Patent
Song

(10) Patent No.: US 11,455,467 B2
(45) Date of Patent: Sep. 27, 2022

(54) RELATION EXTRACTION USING FULL DEPENDENCY FORESTS

(71) Applicant: TENCENT AMERICA LLC, Palo Alto, CA (US)

(72) Inventor: Linfeng Song, Bellevue, WA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 356 days.

(21) Appl. No.: 16/777,261

(22) Filed: Jan. 30, 2020

(65) Prior Publication Data

US 2021/0240933 A1    Aug. 5, 2021

(51) Int. Cl.

| | | |
|---|---|---|
| G06F 40/20 | (2020.01) | |
| G06F 40/295 | (2020.01) | |
| G06F 40/30 | (2020.01) | |
| G06F 17/18 | (2006.01) | |
| G06N 3/04 | (2006.01) | |
| G06F 40/279 | (2020.01) | |
| G06F 40/284 | (2020.01) | |
| G10L 15/183 | (2013.01) | |
| G10L 15/19 | (2013.01) | |
| G06F 40/289 | (2020.01) | |
| G06F 16/901 | (2019.01) | |
| G10L 15/16 | (2006.01) | |

(52) U.S. Cl.
CPC ............ *G06F 40/295* (2020.01); *G06F 17/18* (2013.01); *G06F 40/279* (2020.01); *G06F 40/30* (2020.01); *G06N 3/049* (2013.01); *G06F 16/9027* (2019.01); *G06F 40/284* (2020.01); *G06F 40/289* (2020.01); *G10L 15/16* (2013.01); *G10L 15/183* (2013.01); *G10L 15/19* (2013.01)

(58) Field of Classification Search
None
See application file for complete search history.

(56) References Cited

U.S. PATENT DOCUMENTS

| | | | |
|---|---|---|---|
| 10,380,259 B2 * | 8/2019 | Lee | .......................... G06N 5/04 |
| 11,182,562 B2 * | 11/2021 | Lee | ....................... G06N 3/0454 |
| 2005/0197828 A1 | 9/2005 | McConnell et al. | |

(Continued)

FOREIGN PATENT DOCUMENTS

WO     2019/229769 A1     12/2019

OTHER PUBLICATIONS

Wang et al., "Graph-based Dependency Parsing with Bidirectional LSTM", proceedings of the 54th Annual Meeting of the Association for Computational Linguistics, pp. 2306-2315, Aug. 7-12, 2016.*

(Continued)

*Primary Examiner* — Richard Z Zhu
(74) *Attorney, Agent, or Firm* — Sughrue Mion, PLLC

(57) ABSTRACT

A method, computer program, and computer system is provided for extracting relations between one or more entities in a sentence. A forest corresponding to probabilities of relations between each pair of the entities is generated, and the generated forest generated forest is encoded with relation information for each of the pairs of entities. One or more features are extracted based on the generated forest and the encoded relation information, and a relation is predicted between the entities of each pair of entities based on the extracted features.

20 Claims, 6 Drawing Sheets

(56) References Cited

U.S. PATENT DOCUMENTS

| | | | | |
|---|---|---|---|---|
| 2011/0270604 | A1* | 11/2011 | Qi | G06F 40/30 |
| | | | | 704/9 |
| 2017/0337474 | A1* | 11/2017 | Li | G06F 40/35 |
| 2017/0351749 | A1* | 12/2017 | Quirk | G06F 16/316 |
| 2018/0260381 | A1* | 9/2018 | Carreras | G06F 40/289 |
| 2018/0365229 | A1* | 12/2018 | Buhrmann | G06N 3/0454 |
| 2018/0373699 | A1 | 12/2018 | McAteer et al. | |
| 2019/0057084 | A1* | 2/2019 | Wang | G06F 40/30 |
| 2019/0122111 | A1 | 4/2019 | Min et al. | |

OTHER PUBLICATIONS

International Search Report dated May 26, 2021 in International Application No. PCT/IB2021/050837.
Written Opinion of the International Searching Authority dated May 26, 2021 in International Application No. PCT/IB2021/050837.

\* cited by examiner

RELATION EXTRACTION USING FULL DEPENDENCY FORESTS

BACKGROUND

This disclosure relates generally to field of computing, and more particularly to natural language processing.

As a central task in automatically extracting information, relation extraction aims to determine the relation between a pair of entity mentions. Relation extraction has been shown to be useful to general-purpose natural language understanding and other downstream tasks, such as knowledge-based completion. In the biomedical domain, for example, relation extraction can help doctors make accurate decisions by mining supportive or contradictory evidences from recently published research articles.

SUMMARY

Embodiments relate to a method, system, and computer readable medium for extracting relations between one or more entities in a sentence. According to one aspect, a method for extracting relations between one or more entities in a sentence is provided. The method may include generating, by a computer, a forest corresponding to probabilities of relations between each pair of the entities. The computer may encode the generated forest with relation information for each of the pairs of entities. One or more features may be extracted by the computer based on the generated forest and the encoded relation information. The computer may predict a relation between the entities of each pair of entities based on the extracted features.

According to another aspect, a computer system for extracting relations between one or more entities in a sentence is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include generating, by a computer, a forest corresponding to probabilities of relations between each pair of the entities. The computer may encode the generated forest with relation information for each of the pairs of entities. One or more features may be extracted by the computer based on the generated forest and the encoded relation information. The computer may predict a relation between the entities of each pair of entities based on the extracted features.

According to yet another aspect, a computer readable medium for extracting relations between one or more entities in a sentence is provided. The computer readable medium may include one or more computer-readable storage devices and program instructions stored on at least one of the one or more tangible storage devices, the program instructions executable by a processor. The program instructions are executable by a processor for performing a method that may accordingly include generating, by a computer, a forest corresponding to probabilities of relations between each pair of the entities. The computer may encode the generated forest with relation information for each of the pairs of entities. One or more features may be extracted by the computer based on the generated forest and the encoded relation information. The computer may predict a relation between the entities of each pair of entities based on the extracted features.

BRIEF DESCRIPTION OF THE DRAWINGS

These and other objects, features and advantages will become apparent from the following detailed description of illustrative embodiments, which is to be read in connection with the accompanying drawings. The various features of the drawings are not to scale as the illustrations are for clarity in facilitating the understanding of one skilled in the art in conjunction with the detailed description. In the drawings.

DETAILED DESCRIPTION

Figure 1:
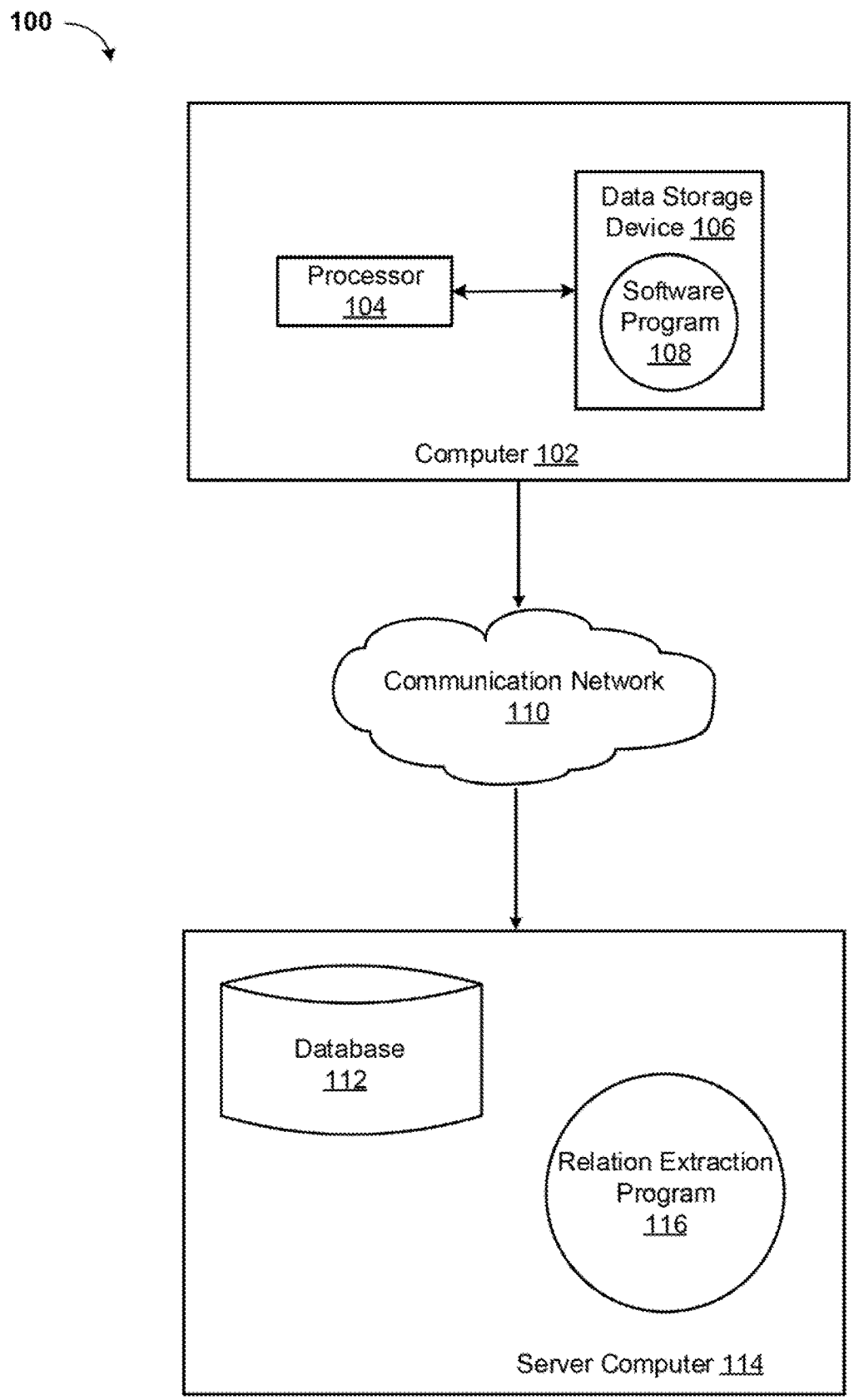
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. Those structures and methods may, however, be embodied in many different forms and should not be construed as limited to the exemplary embodiments set forth herein. Rather, these exemplary embodiments are provided so that this disclosure will be thorough and complete and will fully convey the scope to those skilled in the art. In the description, details of well-known features and techniques may be omitted to avoid unnecessarily obscuring the presented embodiments.

Embodiments relate generally to the field of computing, and more particularly to natural language processing. The following described exemplary embodiments provide a system, method and program product to, among other things, extract relations between one or more entities in a sentence. Therefore, some embodiments have the capacity to improve the field of computing by allowing for the use of deep neural networks to determine the relation between a pair of entity mentions.

As previously described, relation extraction is a central task in automatically extracting information that aims to determine the relation between a pair of entity mentions. Relation extraction has been shown to be useful to general-purpose natural language understanding and other downstream tasks, such as knowledge-based completion. In the biomedical domain, for example, relation extraction can help doctors make accurate decisions by mining supportive or contradictory evidences from recently published research articles. However, syntax-based relation extraction models can suffer from two major issues. First, they may only take the 1-best trees generated during preprocessing, which may introduce errors due to parsing mistakes. Second, 1-best trees may be discrete structures, which may add an additional layer of difficulties for fine-tuning the parser parameters during relation extraction training. It may be advantageous, therefore, to use machine learning and neural networks to determine the relations between pairs of words in sentence using full dependency forests. A full dependency forest may be a fully connected graph, where the vertices may be input words and each edge may represent a dependency relation l (such as "subj" and "nmod") between two words. An edge may also be associated with a weight that may represent the conditional probability of the relation $p(w_j, l|w_i)$. Compared with 1-best trees, full dependency forests may encode all possible dependency relations with their parser confidence scores. In order to efficiently encode them, each forest may be represented as a 3-dimensional tensor of probabilities, with the first two dimensions corresponding to input words and the remaining dimension corresponding to dependency arcs.

Aspects are described herein with reference to flowchart illustrations and/or block diagrams of methods, apparatus (systems), and computer readable media according to the various embodiments. It will be understood that each block of the flowchart illustrations and/or block diagrams, and combinations of blocks in the flowchart illustrations and/or block diagrams, can be implemented by computer readable program instructions.

The following described exemplary embodiments provide a system, method and program product that extracts relations between one or more entities in a sentence. According to the present embodiment, a full dependency forest may be used for relation extraction that may efficiently represent all possible dependency trees within a compact and dense structure, containing all possible trees (including the gold tree). Useful knowledge corresponding to the text may be directly mined from each full forest using a convolutional neural network (CNN). CNNs have shown to be effective on handling dense multi-dimensional data, such as images and videos. In order to allow the model to learn useful features associated with the target mentions during encoding, convolutional kernels may be parameterized with the target mention pairs.

Referring now to FIG. 1, a functional block diagram of a networked computer environment illustrating a relation extraction system 100 (hereinafter "system") for improved extraction of relations between one or more entities in a sentence is shown. It should be appreciated that FIG. 1 provides only an illustration of one implementation and does not imply any limitations with regard to the environments in which different embodiments may be implemented. Many modifications to the depicted environments may be made based on design and implementation requirements.

The system 100 may include a computer 102 and a server computer 114. The computer 102 may communicate with the server computer 114 via a communication network 110 (hereinafter "network"). The computer 102 may include a processor 104 and a software program 108 that is stored on a data storage device 106 and is enabled to interface with a user and communicate with the server computer 114. As will be discussed below with reference to FIG. 4 the computer 102 may include internal components 800A and external components 900A, respectively, and the server computer 114 may include internal components 800B and external components 900B, respectively. The computer 102 may be, for example, a mobile device, a telephone, a personal digital assistant, a netbook, a laptop computer, a tablet computer, a desktop computer, or any type of computing devices capable of running a program, accessing a network, and accessing a database.

The server computer 114 may also operate in a cloud computing service model, such as Software as a Service (SaaS), Platform as a Service (PaaS), or Infrastructure as a Service (IaaS), as discussed below with respect to FIGS. 5 and 6. The server computer 114 may also be located in a cloud computing deployment model, such as a private cloud, community cloud, public cloud, or hybrid cloud.

The server computer 114, which may be used for extracting relations between one or more entities in a sentence is enabled to run a Relation Extraction Program 116 (hereinafter "program") that may interact with a database 112. The Relation Extraction Program method is explained in more detail below with respect to FIG. 3. In one embodiment, the computer 102 may operate as an input device including a user interface while the program 116 may run primarily on server computer 114. In an alternative embodiment, the program 116 may run primarily on one or more computers 102 while the server computer 114 may be used for processing and storage of data used by the program 116. It should be noted that the program 116 may be a standalone program or may be integrated into a larger relation extraction program.

It should be noted, however, that processing for the program 116 may, in some instances be shared amongst the computers 102 and the server computers 114 in any ratio. In another embodiment, the program 116 may operate on more than one computer, server computer, or some combination of computers and server computers, for example, a plurality of computers 102 communicating across the network 110 with a single server computer 114. In another embodiment, for example, the program 116 may operate on a plurality of server computers 114 communicating across the network 110 with a plurality of client computers. Alternatively, the program may operate on a network server communicating across the network with a server and a plurality of client computers.

The network 110 may include wired connections, wireless connections, fiber optic connections, or some combination thereof. In general, the network 110 can be any combination of connections and protocols that will support communications between the computer 102 and the server computer 114. The network 110 may include various types of networks, such as, for example, a local area network (LAN), a wide area network (WAN) such as the Internet, a telecommunication network such as the Public Switched Telephone Network (PSTN), a wireless network, a public switched network, a satellite network, a cellular network (e.g., a fifth generation (5G) network, a long-term evolution (LTE) network, a third generation (3G) network, a code division multiple access (CDMA) network, etc.), a public land mobile network (PLMN), a metropolitan area network (MAN), a private network, an ad hoc network, an intranet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of system 100 may perform one or more functions described as being performed by another set of devices of system 100.

Figure 2:
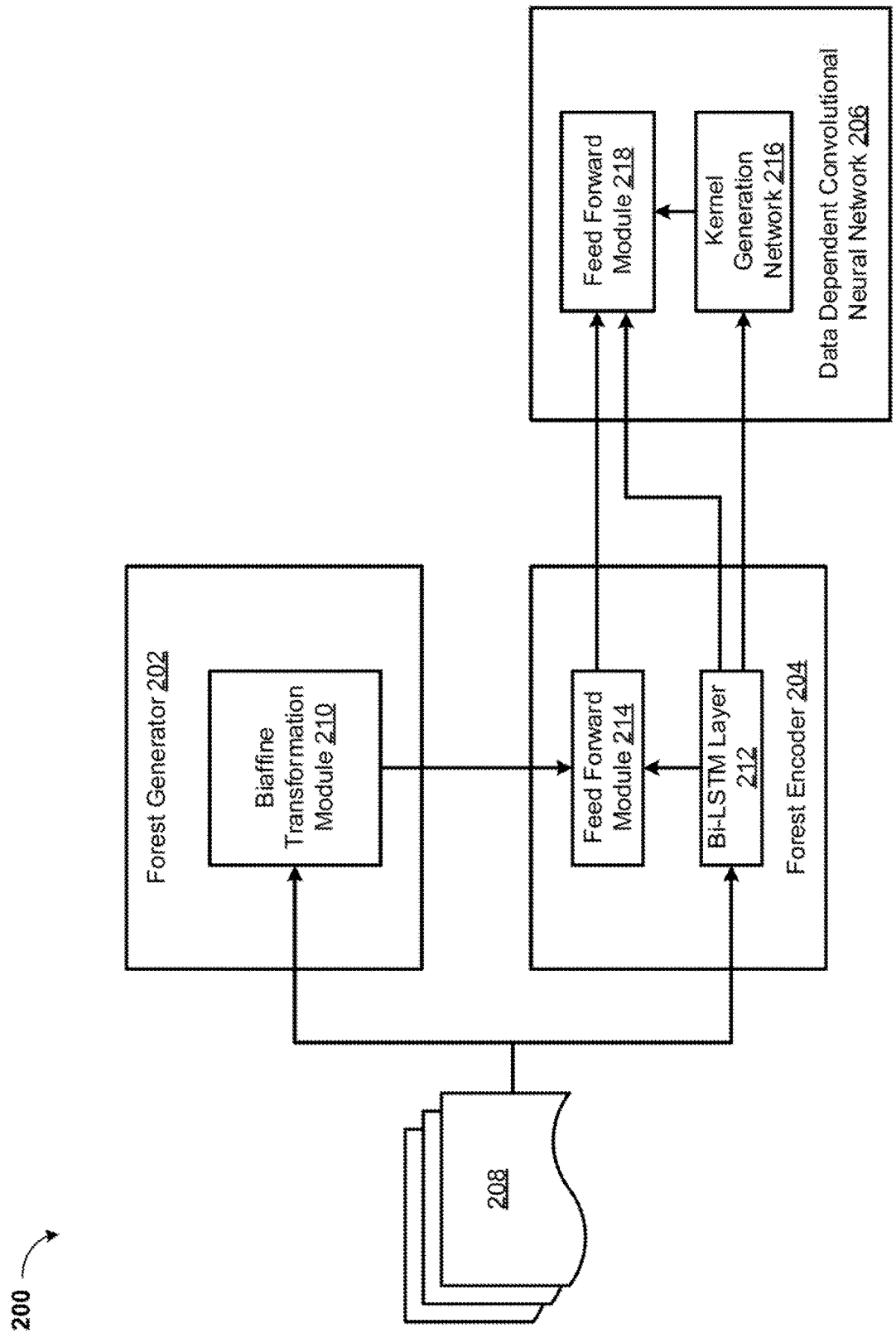
FIG. 2 is a block diagram of a program that extracts relations between one or more entities in a sentence, according to at least one embodiment.

Referring to FIG. 2, a block diagram 200 of the Relation Extraction Program 116 of FIG. 1 is depicted. FIG. 2 may be described with the aid of the exemplary embodiments depicted in FIG. 1. The Relation Extraction Program 116 may accordingly include, among other things, an forest generator 202, a forest encoder 204, and a data-dependent convolutional neural network (CNN) 206. According to one embodiment, the Relation Extraction Program 116 may be located on the computer 102 (FIG. 1). According to an alternative embodiment, the Relation Extraction Program 116 may be located on the server computer 114 (FIG. 1). The Relation Extraction Program may be configured to receive data 208 as input. The forest generator 202 may include a biaffine transformation module 210. The forest encoder 204 may include a bidirectional long short-term memory (Bi-LSTM) layer 212 and a feed-forward module 214. The data-dependent CNN 206 may include a kernel generation network 216 and a feed-forward module 218.

The forest generator 202 may produce a 3-dimensional tensor F as a forest representation of each pair of one or more input words $w_1, \ldots, w_N$, where each lowest-rank vector may correspond to a relation and content of a word pair. The biaffine transformation module 210 may represent one or more input words $w_1, \ldots, w_N$ by their embeddings, before the input words may be processed by the Bi-LSTM layer 212 to obtain their contextual representations $r_1, \ldots, r_N$. The representations for a word $w_i$ being the head or the dependent of any dependency relation may be calculated by the feed-forward module 214 by passing its contextual vector $r_i$ through one or more multi-layer perceptrons (MLPs) $h_i^{dep}=\text{MLP}^{dep}(r_i)$; $h_i^{head}=\text{MLP}^{head}(r_i)$. The scores for all relation labels given a head word $w_j$ and a dependent word $w_i$ may be calculated as $s_{i,j}^{label}=h_j^{head} U_l h_i^{dep}+(h_i^{head} \oplus h_i^{dep})^T v_l + b_l$, and the scores for each unlabeled arc with any possible head word given a dependent word $w_i$ may be calculated as $s_i^{head}=H^{head} U_a h_i^{dep}+H^{head} v_a$, where $U_l$, $V_l$, $b_l$, $U_a$ and $v_a$ may be model parameters. Finally, the conditional probability of each label l and each head word $w_j$ given a dependent word $w_i$ may be calculated as:

$$p(w_j, l|w_i)=p(l|w_j, w_i) \times p(w_j|w_i)=\text{softmax}(s_{i,j}^{label})_{(l)} \times \text{softmax}(s_i^{head})_{(j)}$$

where (x) may be the subscript represents choosing the x-th item from the corresponding vector. Thus, given the words of an input sentence, the calculated probabilities may be organized into a rank-3 tensor, such that no further modification may be required before the probabilities may be processed by the forest generator.

Because the generated forests may, for example, only contain the probabilities of word-to-word relations without any lexical or relational knowledge, it may be necessary to integrate these probabilities with word and relation embeddings. In particular, for each word pair relation $(w_j, l, w_i)$, the word hidden states ($h_j^{(0)}$ and $h_i^{(0)}$, produced by the Bi-LSTM layer 212) and relation embedding ($e_l \in E_l$) may first be concatenated, and then the possible relations may be marginalized by a weighted sum $h_{w_j, w_i} = \Sigma_{l \in L} p(w_j, l|w_i) [h_j^{(0)}; h_i^{(0)}; e_l]$. By using a weighted sum, relations with high probabilities may be highlighted, while other relations may also preserved. A linear layer may be applied on the results of the weighted sum to correlate the concatenated word states and relation embedding $h'_{w_j, w_i}=W_f h_{w_j, w_i}+b_f$, where $W_f$ and $b_f$ are trainable parameters. The resulting representations are organized following the word order of the original sentence into a rank-3 tensor $F \in \mathbb{R}^{|s| \times |s| \times d}$, where $|s|$ is the length of the sentence and d is the length of the representation of a word pair ($h'_{w_j, w_i}$).

Convolutional operations may be applied to the tensor F in order to extract useful features from this structure. For the data-dependent CNN 206, convolution kernels $W_c$ may be produced by the kernel generation network 216. The kernel generation network 216 may correlate the representation vectors of target mentions $h_\xi$ and $h_\zeta$ with a fully-connected layer: $h_{\xi,\zeta}=\text{ReLU}(W_d[h_\xi; h_\zeta]+b_d)$ before a set of data-dependent convolution kernels may be calculated with another multi-dimensional layer $W_c=\text{ReLU}(W_p h_{\xi,\zeta}+B_p)$, where $W_d$, $b_d$, $W_p$, $B_p$ may be model parameters. Next, the generated kernels may be applied on F by the feed-forward module 218 to extract useful features, before max pooling being used to calculate c. For relation prediction, the extracted features (ĉ) may be combined with the mention representations and may be fed into a logistic regression classifier $$h'_{\xi,\zeta}=\text{ReLU}(W_{g1}[h_\xi; h_\zeta]+b_{g1})+\text{ReLU}(W_{g2}\hat{c}+b_{g2})$$

$$y=\text{softmax}(W_r h'_{\xi,\zeta}+b_r),$$

where $W_{g1}$, $b_{g1}$, $W_2$, $b_{g2}$, $W_r$ and $b_r$ may be model parameters.

Figure 3:
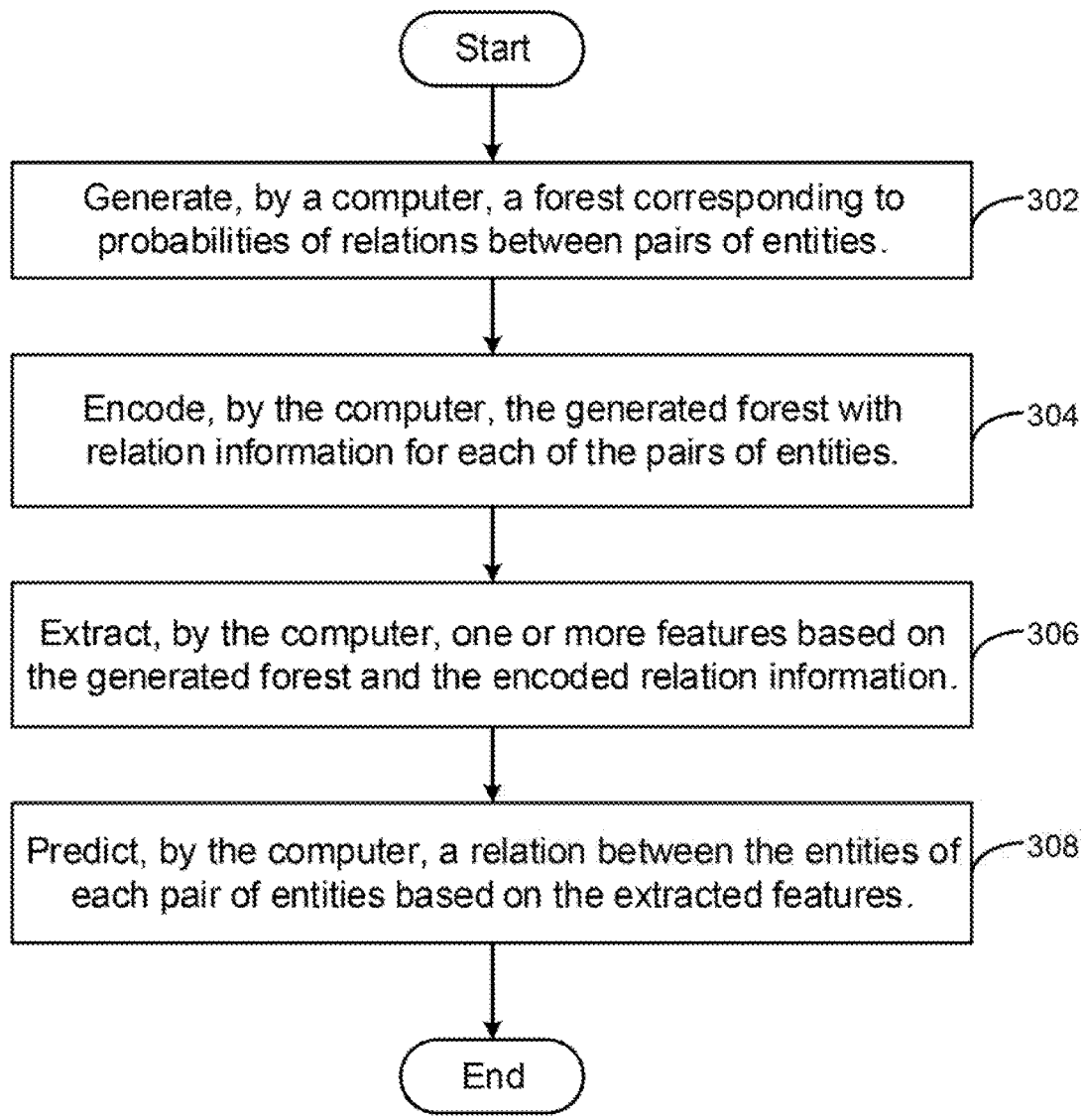
FIG. 3 is an operational flowchart illustrating the steps carried out by a program that extracts relations between one or more entities in a sentence, according to at least one embodiment.

Referring now to FIG. 3, an operational flowchart 400 illustrating the steps carried out by a program that extracts relations between one or more entities in a sentence is depicted. FIG. 3 may be described with the aid of FIGS. 1 and 2. As previously described, the Relation Extraction Program 116 (FIG. 1) may quickly and effectively determine relations between one or more entities in a sentence.

At 302, a forest corresponding to probabilities of relations between pairs of entities is generated by a computer. The forest may be a fully connected graph that may encode all possible dependency relations of entities with respective parser confidence scores. The forest may be a three-dimensional tensor of probabilities, with the first two dimensions corresponding to input words and the remaining dimension corresponding to dependency arcs. In operation, the forest generator 202 (FIG. 2) may process data 208 (FIG. 2) from the database 112 (FIG. 1) containing one or more entities. The biaffine transformation module 210 (FIG. 2) may represent the entities by their respective embeddings.

At 304, the generated forest is encoded with relation information by the computer for each of the pairs of entities. The generated forests may only contain the probabilities of word-to-word relations without any lexical or relational knowledge, so it may be necessary to integrate these probabilities with word and relation embeddings. In operation, the Bi-LSTM layer 212 (FIG. 2) on the forest encoder 204 (FIG. 2) may generate contextual representation for the entities present in the data 208 (FIG. 2) The Bi-LSTM layer 212 may pass the contextual representations to the feed-forward module 214 (FIG. 2), which may also receive the embedding data from the biaffine transformation module 210 (FIG. 2). The feed-forward module may encode the forest with lexical and relational data.

At 306, one or more features is extracted by the computer based on the generated forest and the encoded relation information. The features may be generated by applying convolution kernels to representation vectors and applying max pooling to shrink the output dataset. The convolution kernels are generated through a kernel generation network instead of being generated randomly. In operation, the kernel generation network 216 (FIG. 2) may generate convolution kernels based on the contextual representations from the Bi-LSTM layer 212 (FIG. 2) and may pass these to the feed-forward module 218 (FIG. 2). The feed-forward module 218 may additionally receive data from the Bi-LSTM module 212 and the feed-forward module 214 (FIG. 2) in order to determine features present within the data 208 (FIG. 2).

At 308, a relation between the entities of each pair of entities is predicted by the computer based on the extracted features. The relations may be syntactic relations such as subject-object, subject-verb, or noun-modifier. Determining the dependency of the relations may aid in automatic of extraction of data from documents. In operation, the Relation Extraction Program 116 (FIG. 1) may use the output of the feed-forward module 218 (FIG. 2) of the data-dependent CNN 206 (FIG. 2) to determine the relations between multiple pairs of entities in the data 208 (FIG. 2).

It may be appreciated that FIG. 3 provides only an illustration of one implementation and does not imply any limitations with regard to how different embodiments may be implemented. Many modifications to the depicted environments may be made based on design and implementation requirements.

Figure 4:
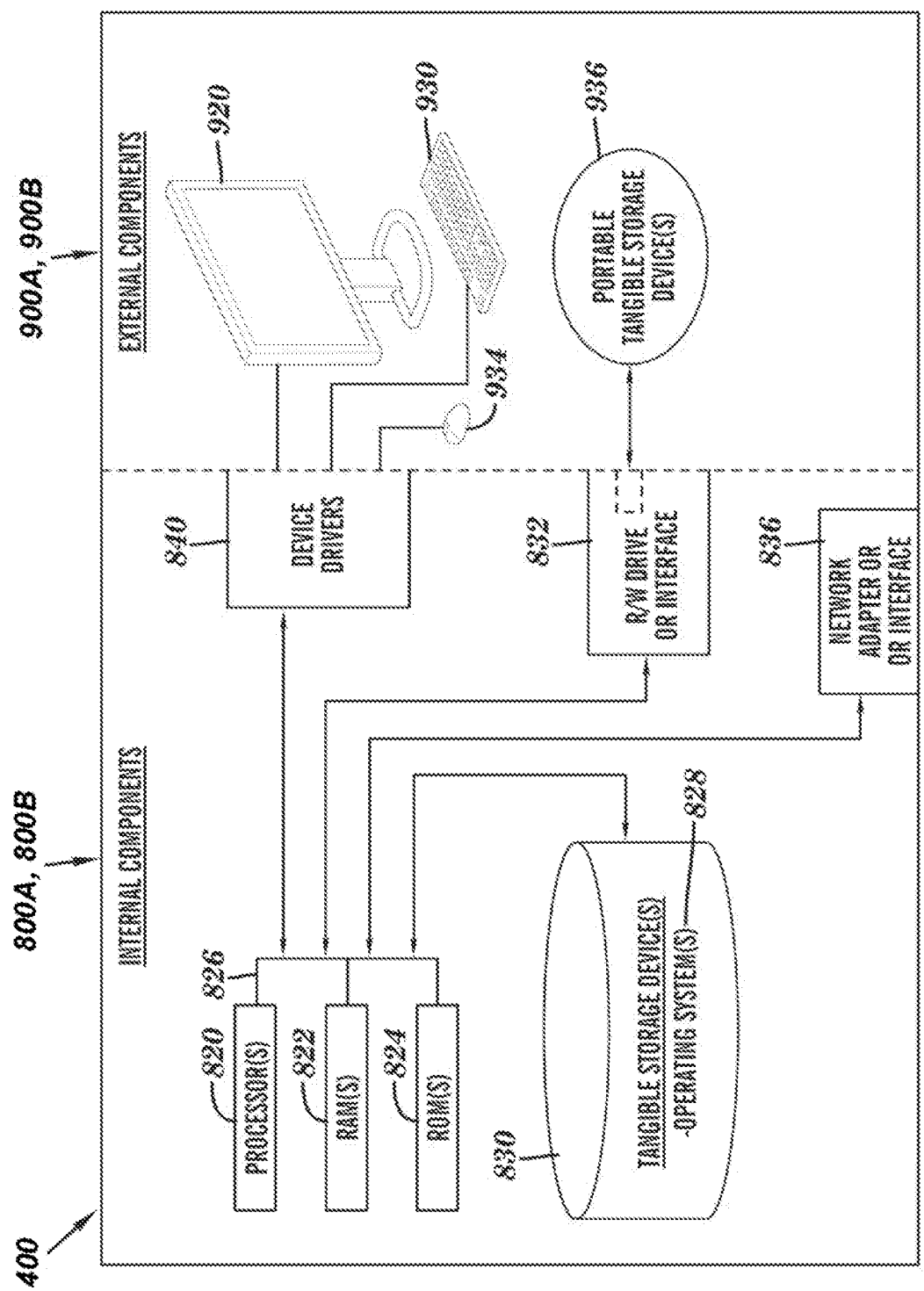
FIG. 4 is a block diagram of internal and external components of computers and servers depicted in FIG. 1 according to at least one embodiment.

FIG. 4 is a block diagram 400 of internal and external components of computers depicted in FIG. 1 in accordance with an illustrative embodiment. It should be appreciated that FIG. 4 provides only an illustration of one implementation and does not imply any limitations with regard to the environments in which different embodiments may be implemented. Many modifications to the depicted environments may be made based on design and implementation requirements.

Computer 102 (FIG. 1) and server computer 114 (FIG. 1) may include respective sets of internal components 800A,B and external components 900A,B illustrated in FIG. 4. Each of the sets of internal components 800 include one or more processors 820, one or more computer-readable RAMs 822 and one or more computer-readable ROMs 824 on one or more buses 826, one or more operating systems 828, and one or more computer-readable tangible storage devices 830.

Processor 820 is implemented in hardware, firmware, or a combination of hardware and software. Processor 820 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 820 includes one or more processors capable of being programmed to perform a function. Bus 826 includes a component that permits communication among the internal components 800A,B.

The one or more operating systems 828, the software program 108 (FIG. 1) and the Relation Extraction Program 116 (FIG. 1) on server computer 114 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory, an optical disk, a magneto-optic disk, a solid state disk, a compact disc (CD), a digital versatile disc (DVD), a floppy disk, a cartridge, a magnetic tape, and/or another type of non-transitory computer-readable tangible storage device that can store a computer program and digital information.

Each set of internal components 800A,B also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as the software program 108 (FIG. 1) and the Relation Extraction Program 116 (FIG. 1) can be stored on one or more of the respective portable computer-readable tangible storage devices 936, read via the respective R/W drive or interface 832 and loaded into the respective hard drive 830.

Each set of internal components 800A,B also includes network adapters or interfaces 836 such as a TCP/IP adapter cards; wireless Wi-Fi interface cards; or 3G, 4G, or 5G wireless interface cards or other wired or wireless communication links. The software program 108 (FIG. 1) and the Relation Extraction Program 116 (FIG. 1) on the server computer 114 (FIG. 1) can be downloaded to the computer 102 (FIG. 1) and server computer 114 from an external computer via a network (for example, the Internet, a local area network or other, wide area network) and respective network adapters or interfaces 836. From the network adapters or interfaces 836, the software program 108 and the Relation Extraction Program 116 on the server computer 114 are loaded into the respective hard drive 830. The network may comprise copper wires, optical fibers, wireless transmission, routers, firewalls, switches, gateway computers and/or edge servers.

Each of the sets of external components 900A,B can include a computer display monitor 920, a keyboard 930, and a computer mouse 934. External components 900A,B can also include touch screens, virtual keyboards, touch pads, pointing devices, and other human interface devices. Each of the sets of internal components 800A,B also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, some embodiments are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
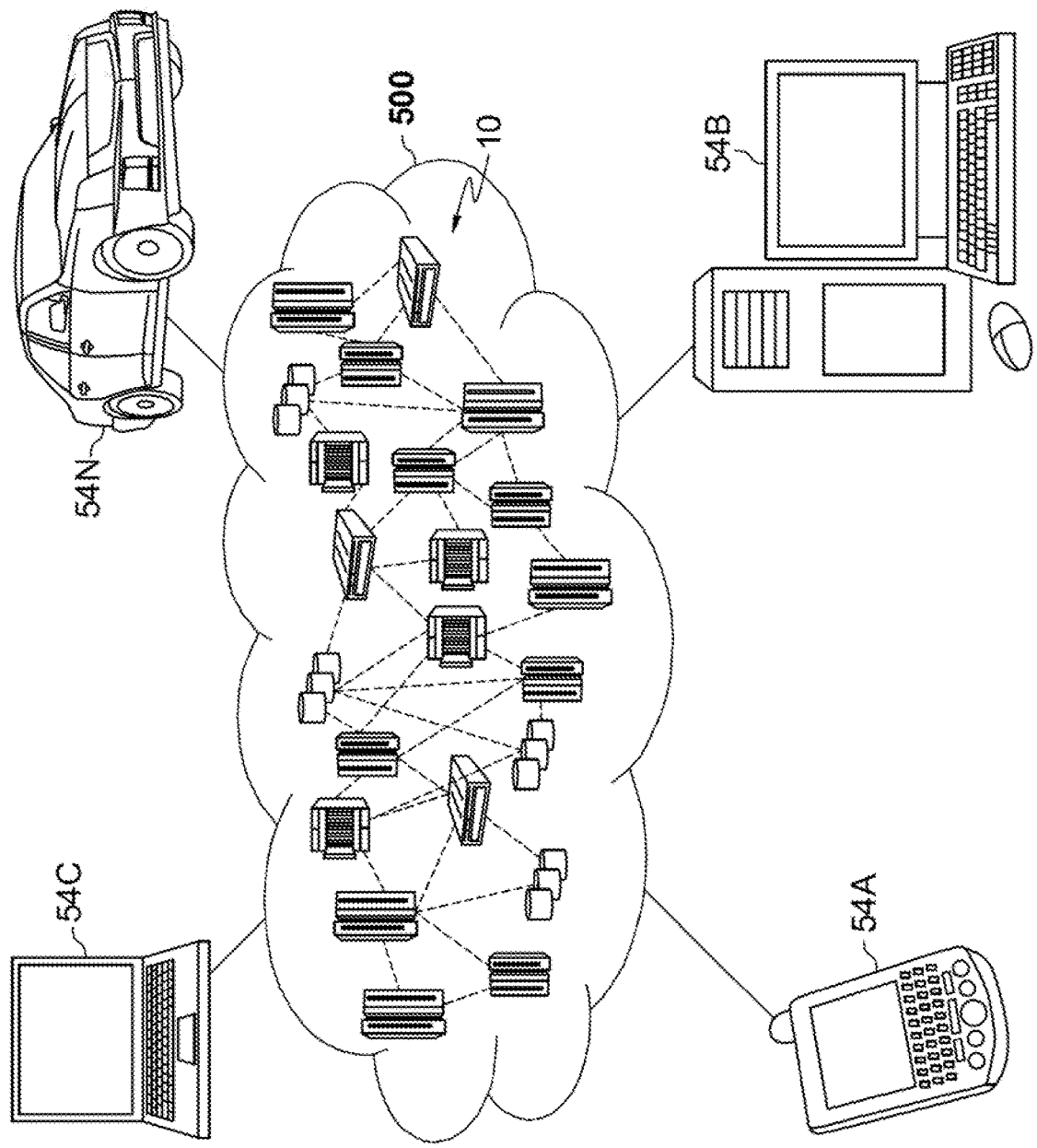
FIG. 5 is a block diagram of an illustrative cloud computing environment including the computer system depicted in FIG. 1, according to at least one embodiment.

Referring to FIG. 5, illustrative cloud computing environment 500 is depicted. As shown, cloud computing environment 500 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 54A-N shown in FIG. 5 are intended to be illustrative only and that cloud computing nodes 10 and cloud computing environment 500 can communicate with any type of computerized device over any type of network and/or network addressable connection (e.g., using a web browser).

Figure 6:
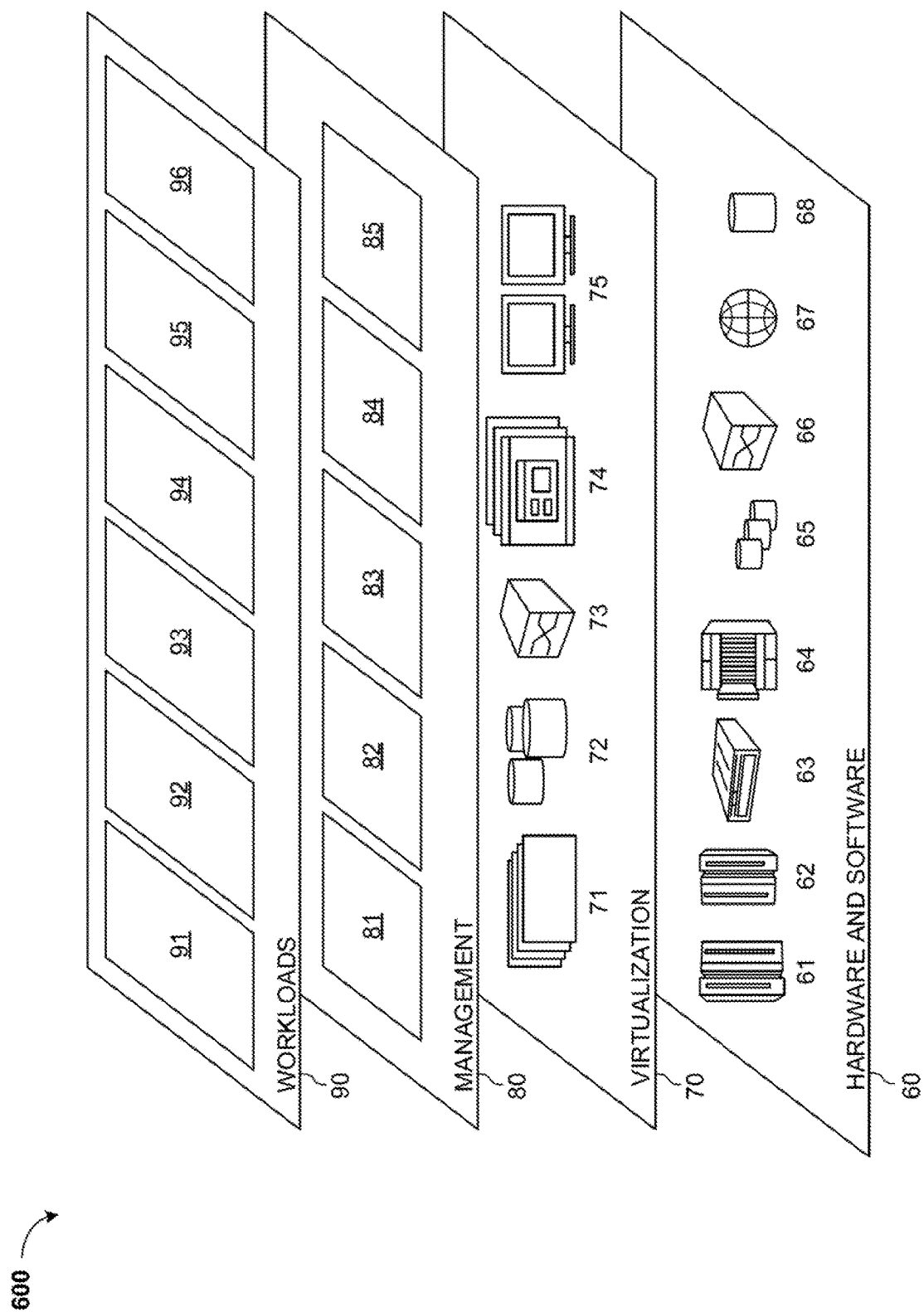
FIG. 6 is a block diagram of functional layers of the illustrative cloud computing environment of FIG. 5, according to at least one embodiment.

Referring to FIG. 6, a set of functional abstraction layers 600 provided by cloud computing environment 500 (FIG. 5) is shown. It should be understood in advance that the components, layers, and functions shown in FIG. 6 are intended to be illustrative only and embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and Relation Extraction 96. Relation Extraction 96 may extract relations between one or more entities in a sentence.

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of extracting relations between one or more entities in a sentence by a computer, the method comprising:
    generating a forest comprising a three-dimensional tensor and corresponding to probabilities of relations between each pair of the entities;
    encoding the generated forest with relation information for each of the pairs of entities;
    correlating representation vectors associated with target mentions corresponding to the entities;
    generating convolution kernels parameterized with the target mentions;
    applying the generated convolution kernels to the correlated representation vectors; and
    extracting features based on the generated forest, the encoded relation information, and the correlated representation vectors to which the generated convolution kernels have been applied; and
    machine-learning a relation between the entities of each pair of entities based on the extracted features and the three-dimensional tensor,
    wherein first and second dimensions of the tensor comprise the entities, and
    wherein a third dimension of the tensor comprises the target mentions each of which indicating ones of relationships between ones of the entities and a plurality of others of the entities.

2. The method of claim 1, wherein generating the forest comprises:
    determining a contextual representation associated with each of the entities;
    calculating a relation score for each of the entities based on the determined contextual representations;
    determining a probability associated with a relation between the entities of each pair of entities based on the calculated relation scores.

3. The method of claim 2, wherein the contextual representations are generated by processing the entities using bidirectional long short-term memory (Bi-LSTM).

4. The method of claim 1, wherein encoding the forest comprises:
    concatenating one or more states associated with each entity;
    calculating a weighted sum corresponding to a probability of a relation between one or more of the entities; and
    correlating the concatenated word states and the calculated weighted sum.

5. The method of claim 4, further comprising organizing the correlated word states and weighted sum based on a word order associated the sentence.

6. The method of claim 1, wherein the extracting the features comprises:
    determining the features based on applying max pooling to the correlated representation vectors.

7. The method of claim 1, wherein the features are extracted using a data-dependent convolutional neural network.

8. The method of claim 7, wherein the data-dependent convolutional neural network utilizes convolution kernels that are not randomly initialized.

9. The method of claim 1, wherein the predicting the relation between the entities of each pair of entities based on the extracted features comprises:
    combining the extracted features with the contextual representations; and
    determining a logistic regression based on the combined extracted features and contextual representations.

10. The method of claim 1, wherein the three-dimensional tensor encodes one or more possible dependency relations between the entities and one or more parser confidence scores corresponding to the entities.

11. A computer system for extracting relations between one or more entities in a sentence, the computer system comprising:
    one or more computer-readable non-transitory storage media configured to store computer program code; and
    one or more computer processors configured to access said computer program code and operate as instructed by said computer program code, said computer program code including:
        generating code configured to cause the one or more computer processors to generate a forest comprising a three-dimensional tensor and corresponding to probabilities of relations between each pair of the entities, encoding code configured to cause the one or more computer processors to encode the generated forest with relation information for each of the pairs of entities;

correlating code configure to cause the one or more computer processors to correlate representation vectors associated with target mentions corresponding to the entities;

further generating code configured to cause the one or more computer processors to generate convolution kernels parameterized with the target mentions;

applying code configured to cause the one or more computer processors to apply the generated convolution kernels to the correlated representation vectors;

extracting code configured to cause the one or more computer processors to extract features based on the generated forest the encoded relation information, and the correlated representation vectors to which the generated convolution kernels have been applied; and machine-learning code configured to cause the one or more computer processors to machine-learn a relation between the entities of each pair of entities based on the extracted features and the three-dimensional tensor, wherein first and second dimensions of the tensor comprise the entities, and wherein a third dimension of the tensor comprises the target mentions each of which indicating ones of relationships between ones of the entities and a plurality of others of the entities.

12. The system of claim 11, wherein the generating code comprises:

contextual representation determining code configured to cause the one or more computer processors to determine a contextual representation associated with each of the entities;

calculating code configured to cause the one or more computer processors to calculate a relation score for each of the entities based on the determined contextual representations;

probability determining code configured to cause the one or more computer processors to determine a probability associated with a relation between the entities of each pair of entities based on the calculated relation scores.

13. The system of claim 12, wherein the contextual representations are generated by processing the entities using bidirectional long short-term memory (Bi-LSTM).

14. The system of claim 11, wherein encoding code comprises:

concatenating code configured to cause the one or more computer processors to concatenate one or more states associated with each entity;

calculating code configured to cause the one or more computer processors to calculate a weighted sum corresponding to a probability of a relation between one or more of the entities; and correlating code configured to cause the one or more computer processors to correlate the concatenated word states and the calculated weighted sum.

15. The system of claim 14, further comprising:

organizing code configured to cause the one or more computer processors to organize the correlated word states and weighted sum based on a word order associated the sentence.

16. The system of claim 11, wherein the extracting code comprises:

determining code configured to cause the one or more computer processors to determine the features based on applying max pooling to the correlated representation vectors.

17. The system of claim 11, wherein the features are extracted using a data-dependent convolutional neural network.

18. The system of claim 17, wherein the data-dependent convolutional neural network utilizes convolution kernels that are not randomly initialized.

19. The system of claim 11, wherein the predicting code comprises:

combining code configured to cause the one or more computer processors to combine the extracted features with the contextual representations; and determining code configured to cause the one or more computer processors to determine a logistic regression based on the combined extracted features and contextual representations.

20. A non-transitory computer readable medium having stored thereon a computer program for extracting relations between one or more entities in a sentence, the computer program configured to cause one or more computer processors to:

generate a forest comprising a three-dimensional tensor and corresponding to probabilities of relations between each pair of the entities, encode the generated forest with relation information for each of the pairs of entities;

correlate representation vectors associated with target mentions corresponding to the entities;

generate convolution kernels parameterized with target mentions;

apply the generated convolution kernels to the correlated representation vectors; and extract features based on the generated forest the encoded relation information, and the correlated representation vectors to which the generated convolution kernels have been applied; and machine-learning a relation between the entities of each pair of entities based on the extracted features and the three-dimensional tensor, wherein first and second dimensions of the tensor comprise the entities, and wherein a third dimension of the tensor comprises the target mentions each of which indicating ones of relationships between ones of the entities and a plurality of others of the entities.

* * * * *